3,350,439
PROCESS FOR PREPARING
AMINOALKANENITRILES
Julian Feldman and Martin Thomas, Cincinnati, Ohio, assignors to National Distillers and Chemical Corporation, New York, N.Y., a corporation of Virginia
No Drawing. Filed June 1, 1965, Ser. No. 460,560
10 Claims. (Cl. 260—465.5)

ABSTRACT OF THE DISCLOSURE

A process for preparing alpha-alkyl-omega-aminoalkanenitriles by hydrogenating a branched chain, unsaturated dinitrile with hydrogen in two steps comprising (1) hydrogenation at a temperature of about 10° to 100° C., and a pressure of about 100 to 2000 p.s.i. in the presence of a palladium or platinum metal catalyst, and (2) hydrogenating the reaction product mixture with less than a stoichiometric amount of hydrogen at a temperature of from about 50° to 150° C., and a pressure of at least 1000 p.s.i. in the presence of a nickel, cobalt or ruthenium metal catalyst and a suppressant such as ammonia. When the starting compound is 2-methylene glutaronitrile, the final product is 2-methyl-5-aminovaleronitrile.

---

This is a continuation-in-part of copending application Ser. No. 385,500, filed July 27, 1964, now U.S. Patent 3,322,815, and entitled "Aminoalkanenitriles and Process for Preparing the Same."

The present invention relates to an improved process for preparing aminoalkanenitriles. More particularly, the invention pertains to an improved process for preparing alkyl substituted omega-aminoalkanenitriles such as 2-methyl-5-aminovaleronitrile.

In the parent application, Ser. No. 385,500, there is disclosed a process for preparing alpha-alkyl-omega-aminoalkanenitriles by selectively hydrogenating alpha-substituted, unsaturated aliphatic dinitriles at elevated temperatures and pressures in the presence of certain specific catalysts and ammonia or an amine capable of suppressing secondary amine formation. The process was generally carried out by introducing the dinitrile starting material, the ammonia or amine, and the selective hydrogenation catalyst into a conventional reactor, such as an autoclave, and then submitting the resulting reaction mixture to elevated hydrogen pressure at elevated temperatures for a period of time sufficient to cover the dinitrile to the omega-aminoalkanenitrile. Agitation or stirring was utilized during the reaction, and completion of the reaction was indicated by a cessation of the uptake of hydrogen. The resulting alpha-alkyl-omega-aminoalkanenitrile product was recovered from the resulting reaction production mixture by conventional means such as fractional distillation, extraction, and the like. In actual practice, it was found that the vinylidene group, or substituted vinylidene group (alkylidene), i.e.

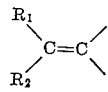

in the starting material is activated to such an extent that it reacts with the ammonia or amine suppressant resulting in the formation of undesirable quantities of polymeric and condensation by-products. Thus, for example, in the preparation of 2-methyl-5-aminovaleronitrile from 2-methylene glutaronitrile, the methylene group was so reactive that substantial quantities of undesirable by-products were produced in the aforedescribed one-step hydrogenation process.

One object of the present invention is to provide an improved process for the preparation of alkyl substituted omega-aminoalkanenitriles from alpha-substituted, aliphatic dinitriles.

Another object of the present invention is to provide a hydrogenation process for the preparation of alkyl substituted omega-aminoalkanenitriles from alpha-substituted, aliphatic unsaturated dinitriles which avoids the difficulties encountered in the previously disclosed process.

A further object of the present invention is to provide an improved process for the hydrogenation of 2-methylene glutaronitrile to produce 2-methyl-5-aminovaleronitrile.

These and other objects of the present invention will become readily apparent from the ensuing description and illustrative embodiment.

In accordance with the present invention, it has now been found that alpha-alkyl-omega-aminoalkanenitriles can readily be prepared in superior yields by a two-step hydrogenation of alpha-substituted aliphatic unsaturated dinitriles under carefully controlled reaction conditions. In general, the first step comprises catalytically hydrogenating the dinitrile starting material under moderate temperature and pressure conditions so as to completely hydrogenate the unsaturated side chain with substantially no hydrogenation of either nitrile group. The resulting reaction product, an alpha-alkyl, aliphatic dinitrile, is then preferably separated from catalyst unless the same catalyst or catalyst mixture is used in both hydrogenation steps. In the second step, the saturated dinitrile obtained from the first step is hydrogenated at elevated temperatures and pressures, preferably in the presence of a Group VIII hydrogenation catalyst and a suppressant for secondary amine formation, such as ammonia or selected amines. Completion of this reaction is indicated by cessation of hydrogen uptake. The resulting alpha-alkyl-omega-aminoalkanenitrile product can be isolated or recovered from the resulting reaction product mixture by conventional means as described above.

In order to further minimize undesirable polymerization and side reactions, it is preferabl to carry out the second step in the presence of an inert diluent. Generally, it is preferable to carry out the first step in the absence of any added diluent, although a diluent may be added if so desired. It is also desirable at times to provide agitation or stirring during either or both of the hydrogenation steps, and this may be accomplished by utilizing conventional equipment or by passing the liquid reactants over a fixed bed of the solid catalytic material.

The alpha-substituted, aliphatic unsaturated dinitrile employed as the starting material in the process of this invention has the following structural formula:

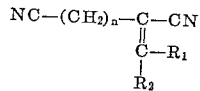

wherein $n$ is an integer from about 1 to 12, preferably about 1 to 6, and $R_1$ and $R_2$ are selected from the group consisting of hydrogen and an aliphatic, straight or branched chain, alkyl group having from 1 to 12 carbon atoms, and preferably from 1 to 6 carbon atoms. $R_1$ and $R_2$ may be the same or different. Examples of specific dinitrile compounds which can be employed as starting material includes 2-methylene glutaronitrile, 2-ethylidene glutaronitrile, 2-ethylidene adiponitrile and 2-propylidene glutaronitrile. The use of 2-methylene glutaronitrile is especially preferred.

The diluent or diluents which may be employed in carrying out the process of this invention must exhibit a measurable solubility toward the dinitrile starting materials, and when employed in the second step, toward any ammonia or amine present. It must also be inert to the reactants and products. The same diluent may be employed in both reaction steps of the present process. An example of suitable solvents include low molecular weight alkanols having from 1 to 12 carbon atoms per molecule. The use of saturated, aliphatic alcohols having from 1 to 6 carbon atoms per molecule have been found particularly effective for this purpose. Such alcohols include methanol, ethanol, propanol, isopropanol, butanol, hexanol, etc. The actual amount of diluent employed is not critical and may vary over a wide range. In general, the volume ratio of diluent to the dinitrile feed material will range from about 1:1 to 10:1, preferably about 1:1.

The use of ammonia as the suppressant for secondary amine formation in the second step of the process is preferred. However, it has also been found that tertiary alkyl amines having from about 3 to 18 carbon atoms per molecule have also proven to be effective. Of the tertiary alkyl aliphatic amines having from 3 to 15 carbon atoms such as triethylamine, trimethylamine, tri-n-butylamine, trisobutylamine, tri-n-propylamine and tri-n-amylamine are preferred. Only a sufficient amount of the ammonia or amine necessary to effectively suppress the formation of secondary amines need be employed. In general, however, the molar ratio of ammonia or amine to the aliphatic dinitrile starting material will range from about 1:1 to 10:1, and preferably from 4:1 to 6:1. It should be understood that higher ratios may also be employed without effecting the rate of conversion to the desired alpha-alkyl-omega-aminoalkanenitrile product.

The particular catalyst employed in each step of the process is an important feature of this invention. It was found essential to employ Group VIII hydrogenation catalysts, since other metal catalysts were found to be ineffective or undesirable for the present purposes. For the first step, it is preferred to use noble metal selected from the group consisting of platinum and palladium metal-containing catalysts. For the second step, preferred catalysts are selected from the group consisting of nickel, cobalt, and ruthenium metal-containing catalysts. It is also possible to use a copper chromite ($Cu_2OCr_2O_3$) catalyst. Only catalytic amounts of such catalysts need be employed.

It will be further understood that for some purposes it is also possible to use the nickel, cobalt or ruthenium metal-containing catalysts in both hydrogenation steps. This has the advantage of eliminating an intermediate catalyst separation step. Nevertheless, the preferred method of carrying out the process of this invention involves the use of separate catalyst systems, as described above.

For either step, it is often desirable to employ the catalyst on an inert support or carrier such as carbon, kieselguhr, silica, alumina, and the like. For the second step, it is also possible to enhance the activity of the catalyst by utilizing a metal or metal oxide promoter such as zirconium oxide, etc. Especially preferred catalysts for the first step are palladium on carbon, platinum on carbon, platinum metal, platinum oxide, palladium metal, Adams catalyst, etc. Preferred for the second step are Raney cobalt, zirconium-promoted cobalt on kieselguhr, Raney nickel, nickel on kieselguhr, and ruthenium on carbon. It will be understood, however, that neither the use of a support nor the use of a promoter are critical features of the present invention. Advantageously, each of the above catalysts is commercially available.

Although the amount of metal catalyst employed in either step need only be sufficient to obtain catalytic action, the amount of metal-containing catalyst generally employed in the first step will range from about 0.1 to 30%, preferably about 1 to 10% by weight, based on the total weight of the unsaturated dinitrile feed material. In the second step, the catalyst employed will generally range from about 6 to 50%, and preferably about 10 to 40%, by weight based on the total weight of saturated dinitrile feed.

The temperature at which the hydrogenation of the first step of the process is carried out is relatively mild, ranging generally from about 10° to 100° C., and preferably from about 20° to 80° C. At lower temperatures, the rate of reaction is undesirably slow, while the use of higher temperatures tends to result in premature reduction of the nitrile groups and undesirable side reactions. The hydrogen pressures employed in the first step will range from about atmospheric up to about 2000 p.s.i., and preferably from about 100 to 1000 p.s.i.

In the second step of the process, higher temperatures, in the range of about 50° to 150° C., and preferably, from above about 80° to 120° C. are used. If lower temperatures are employed, it was found that the rate of reaction is undesirably slow. Higher temperatures are possible where increased reaction rates are deemed necessary. In general, the reaction temperatures employed in the second step will be at least 30° C., and preferably from about 50° to 150° C., higher than the temperature used in the first step. The hydrogen pressure in the second step will range from about 1000 to 10,000 p.s.i., preferably from about 2000 to 6000 p.s.i. Thus, the pressure in the second step will be at least 1000 p.s.i., and preferably from about 2000 to 5000 p.s.i., higher than the pressure in the first step. The second step, in addition to more severe operating conditions, also requires the use of an amount of hydrogen, which is no more than about 60%, preferably about 40 to 50%, the stoichiometric amount required to convert both of the nitrile groups to amine groups.

The compounds produced by practicing the process of this invention are alpha-alkyl-omega-aminoalkanenitriles having the following structural formula:

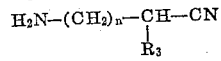

wherein $n$ is an integer from about 1 to 12, preferably about 2 to 6, and $R_3$ is a straight or branched-chain alkyl radical having from 1 to 12 carbon atoms, and preferably 1 to 6 carbon atoms. Specific compounds include, for example:

2-methyl-5-aminovaleronitrile
2-ethyl-7-aminoheptanenitrile
2-ethyl-4-aminobutyronitrile
2-methyl-10-aminodecanenitrile
2-ethyl-6-aminocapronitrile The invention will be more fully understood by reference to the following illustrative example.

EXAMPLE

In the first step, 2-methylene glutaronitrile 574 g. (5.4 moles) was hydrogenated in a stainless steel Magna Dash autoclave with 5.7 g. of 5% palladium on carbon as catalyst at a temperature of 22° C. and 100 atms. of hydrogen pressure. The reduction proceeded until there was no further drop in hydrogen pressure. Then, the reaction mixture was filtered to remove the catalyst. The product recovered, weighed 561 g. Gas chromatographic analysis showed the product to be completely saturated, i.e., 2-methyl glutaronitrile.

In the second step, the 2-methyl glutaronitrile (30 g., 0.28 mole) was partially hydrogenated in a stainless steel autoclave with 7.5 g. of Raney cobalt as catalyst in the presence of 32 ml. of absolute alcohol and 24.4 g. of anhydrous ammonia at a temperature of 100° C. and a pressure of 238 atms. The reduction was stopped when the observed pressure drop was 950 p.s.i. This indicated that the theoretical amount of hydrogen necessary for the reduction of one nitrile group had been absorbed. Gas chromatographic analysis of the reaction mixture gave the following composition: 63% 2-methyl aminovaleronitrile, 34% 2-methyl-1,5-diaminopentane, and 3% 3-methyl piperidine. These products are readily separated by fractional distillation.

The above data show that the process of this invention can be effectively employed for the production of valuable alkyl substituted omega-aminoalkanenitrile.

While a particular embodiment of this invention is shown above, it will be understood that the invention is obviously subject to variations and modification without departing from its broader aspects.

What is claimed is:

1. A process for preparing alpha-alkyl-omega aminoalkanenitriles which comprises the following sequential steps:

(a) contacting a dinitrile compound having the formula

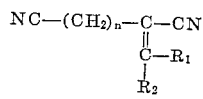

wherein $n$ is an integer from 1 to 12, $R_1$ and $R_2$ are hydrogen, with hydrogen at a temperature within the range of about 10° to 100° C., a pressure of from about 100 to 2,000 p.s.i., in the presence of a palladium or platinum metal hydrogenation catalyst to obtain a reaction product containing 2-alkyl-alkanedinitrile; and separating the catalyst therefrom (b) contacting the thus treated reaction product mixture with hydrogen, said hydrogen being less than about 60% of the amount stoichiometrically required to reduce both nitrile groups, in the presence of ammonia, tertiary alkyl amin, or mixtures thereof, as a suppressant at a temperature within the range of about 50° to 150° C., and at a pressure of at least 1000 p.s.i., in the presence of a nickel, cobalt or ruthenium hydrogenation catalyst, and recovering said alpha-alkyl-omega-aminoalkanenitrile.

2. The process of claim 1 wherein said step (b) reaction pressure is within the range of about 2000 to 6000 p.s.i.

3. The process of claim 1 wherein said suppressant is ammonia.

4. The process of claim 1 wherein said ammonia suppressant is admixed with a lower alkanol.

5. A process for preparing 2-methyl-5-aminovaleronitrile from 2-methylene glutaronitrile which comprises the following steps:

(a) contacting the 2-methylene glutaronitrile with hydrogen at a temperature within the range of about 10° to 100° C., a pressure of from about 100 to 2,000 p.s.i., in the presence of a palladium or platinum metal hydrogenation catalyst, separating the catalyst residue from the resulting reaction product mixture containing 2-methyl glutaronitrile; and (b) contacting the thus treated reaction product mixture with hydrogen, said hydrogen being less than about 60% of the amount stoichiometrically required to reduce both nitrile groups, at a temperature within the range of about 50° to 150° C., a pressure of at least about 1000 p.s.i., in the presence of an ammonia suppressant and a nickel, cobalt or ruthenium hydrogenation catalyst to obtain a reaction product mixture containing 2-methyl-5-aminovaleronitrile, and recovering said 2-methyl-5-aminovaleronitrile.

6. The process of claim 5 wherein the step (a) hydrogenation catalyst is palladium metal.

7. The process of claim 5 wherein the step (b) pressure is within the range of about 2000 to 6000 p.s.i.

8. The process of claim 5 wherein the step (b) hydrogenation catalyst is cobalt metal.

9. The process of claim 5 wherein step (b) is carried out in the presence of a lower alkanol.

10. The process of claim 5 wherein step (b) is carried out in the presence of an amount of hydrogen which is about 40 to 50% of that stoichiometrically required to reduce both nitrile groups.

References Cited

UNITED STATES PATENTS

| | | | |
|---|---|---|---|
| 2,208,598 | 7/1940 | Rigby | 260—465.5 |
| 2,257,814 | 10/1941 | Rigby | 260—465.5 |
| 2,532,312 | 12/1950 | Romilly | 260—465.8 |
| 2,606,204 | 8/1952 | Hogsed et al. | 260—465.8 |
| 2,762,835 | 9/1956 | Swerdloff | 260—465.5 |
| 2,999,107 | 9/1961 | Lindsey et al. | 260—465.8 |

OTHER REFERENCES

Groggins: "Unit Processes in Organic Synthesis," 5th ed., 1958, pp. 575, 576, 589, 590.

JOSEPH P. BRUST, *Primary Examiner.*